US011496018B2

(12) United States Patent
Mongeau et al.

(10) Patent No.: US 11,496,018 B2
(45) Date of Patent: Nov. 8, 2022

(54) ELECTRICAL GENERATORS IN WIND TURBINES

(71) Applicant: Vestas Wind Systems A/S, Aarhus (DK)

(72) Inventors: Peter Mongeau, Center Conway, NH (US); Lars Langvardt Krogh, Egå (DK); Mustafa Gündüz, Lübeck (DE); Xiaolu Ding, Stockelsdorf (DE); Ulrich Meinekat, Eutin (DE); Nicole Farell, Dassow (DE)

(73) Assignee: Vestas Wind Systems A/S, Aarhus (DK)

( * ) Notice: Subject to any disclaimer, the term of this patent is extended or adjusted under 35 U.S.C. 154(b) by 0 days.

(21) Appl. No.: 17/420,236

(22) PCT Filed: Jan. 8, 2020

(86) PCT No.: PCT/DK2020/050003
§ 371 (c)(1),
(2) Date: Jul. 1, 2021

(87) PCT Pub. No.: WO2020/143886
PCT Pub. Date: Jul. 16, 2020

(65) Prior Publication Data

US 2022/0085680 A1 Mar. 17, 2022

Related U.S. Application Data

(60) Provisional application No. 62/790,551, filed on Jan. 10, 2019.

(30) Foreign Application Priority Data

Jan. 30, 2019 (DK) .......................... PA 2019 70065

(51) Int. Cl.
*H02K 3/50* (2006.01)
*F03D 9/25* (2016.01)
(Continued)

(52) U.S. Cl.
CPC ................. *H02K 3/50* (2013.01); *F03D 9/25* (2016.05); *F03D 13/20* (2016.05); *H02K 7/1838* (2013.01);
(Continued)

(58) Field of Classification Search
CPC .... H02K 3/50; H02K 7/1838; H02K 2203/09; H02K 5/225; F03D 9/25; F03D 13/20; F05B 2220/706; F05B 2240/912
(Continued)

(56) References Cited

U.S. PATENT DOCUMENTS

2014/0252922 A1* 9/2014 Ritchey ................ H02K 5/1737
310/425
2017/0366059 A1 12/2017 Iizuka et al.

FOREIGN PATENT DOCUMENTS

CN 201877756 U 6/2011
CN 203608002 U 5/2014
(Continued)

OTHER PUBLICATIONS

Danish Patent and Trademark Office, Search and Examination Report in PA 2019 70065, dated Sep. 11, 2019.
(Continued)

*Primary Examiner* — Charles Reid, Jr.
(74) *Attorney, Agent, or Firm* — Wood Herron & Evans LLP (57) ABSTRACT

The invention relates to a generator for a wind turbine including a housing of substantially cuboidal form within which is mounted a stator. The stator has one or more multi-phase windings and a bus ring is provided for conveying electrical power from the windings to power take-off modules. One end of the power take-off modules is connected to the bus ring, and the other end of the modules has a plurality of power take-off interfaces for connection to
(Continued)

power take-off cables. The distal ends of the power take-off modules are located in the corners of the cuboidal generator housing.

22 Claims, 8 Drawing Sheets

(51) Int. Cl.
*F03D 13/20* (2016.01)
*H02K 7/18* (2006.01)

(52) U.S. Cl.
CPC ... *F05B 2220/706* (2013.01); *F05B 2240/912* (2013.01); *H02K 2203/09* (2013.01)

(58) Field of Classification Search
USPC ...................................................... 290/44, 55
See application file for complete search history.

(56) References Cited

FOREIGN PATENT DOCUMENTS

| | | | |
|---|---|---|---|
| EP | 2690757 A2 | 1/2014 | |
| EP | 2811601 A2 | 12/2014 | |
| EP | 2630367 B1 * | 6/2015 | ............. F03D 1/001 |
| EP | 2630367 B1 | 6/2015 | |
| EP | 3085958 A1 * | 10/2016 | ............. B65H 49/26 |
| EP | 3085958 A1 | 10/2016 | |
| WO | 2014082682 A1 | 6/2014 | |

OTHER PUBLICATIONS

European Patent Office, International Search Report and Written Opinion in PCT Application No. PCT/DK2020/050003, dated May 12, 2020.

* cited by examiner

ELECTRICAL GENERATORS IN WIND TURBINES

TECHNICAL FIELD

The present invention relates generally to generators for wind turbines and more specifically to electrical power take-off equipment for such generators.

BACKGROUND

Modern commercial-scale wind turbines are increasingly being used to generate electrical power for supply to electrical distribution grids for onward supply to homes and industry. As the use of wind generated electrical power becomes more prevalent, there is increasing need for generator equipment which may be readily and economically manufactured and maintained.

Generators for wind turbines comprise a stator having a stator core onto which are wound a number of multi-phase windings. Typically, the stator comprises two three-phase windings for the supply of three-phase electrical power to the grid. As is well known in the art, electric current is induced in each winding by the action of a rotating magnetic field in the vicinity of the windings. Commonly, the rotating magnetic field is produced by the rotation of permanent magnets located in the rotor of the generator. The rotor of the generator is driven directly, or indirectly, by the rotor of the wind turbine.

The generator of a wind turbine is typically located within a nacelle which is positioned at the top of a wind turbine tower when in use. The nacelle supports the rotor of the wind turbine and provides a housing for the electrical and mechanical equipment required to convert the rotary motion of the wind turbine rotor into electrical power. The nacelle is ideally of as small a size and as low a weight as possible due to its in-service location at the top of the tower. It is therefore desirable to minimise weight and maximise packaging efficiency within the nacelle.

Each winding of the generator must be electrically connected to power conversion equipment for onward transfer of electrical power to the grid. In existing generators bus rings are used to connect the ends of each winding to power take-off cables, often referred to as "flying leads". Due to the large number of windings, and due to the need to minimise current density in the cables to avoid overheating, a large number of cables are routed from the bus ring to the exterior of the generator. The large number of cables, and their associated connections and electrical insulation, take up considerable space within the generator housing.

In existing generators, the power take-off cables are attached to the generator during manufacture. Typically, such power take-off cables are permanently attached to the generator and are not designed to permit removal or replacement. Each cable is connected to a specific location on the bus ring and routed to the outside of the generator via one or more openings in the generator housing. Typically, two sets of cables exit the housing via two openings, one for each three-phase winding.

Assembly of the generator is complicated and time consuming requiring multiple lengths of cable for specific connection points on the bus ring. The skill level required to assemble the generator correctly is high, and the bill of materials is complex and expensive. Not only is the assembly process complex and therefore prone to error, transportation of the generator is also difficult due to the "flying" ends of the cables which are delicate and which must therefore be well protected adding yet more time and expense.

It is common for the generators of wind turbines to require maintenance when in situ at the top of a wind turbine tower. If one of the power cables fails, it is necessary to access the cable in question for it to be repaired. This can be extremely difficult due to the complexity of the cable connections and the limited access within both the nacelle and generator housing.

It is against this background that the present invention has been developed.

SUMMARY OF THE INVENTION

In a first aspect of the invention there is provided a generator for a wind turbine having a central axis, the generator comprising a housing of substantially cuboidal form; a stator mounted within the housing, the stator comprising one or more multi-phase windings; and a bus ring for conveying electrical power from the one or more multi-phase windings to one or more power take-off modules; wherein the or each power take-off module comprises a proximal end portion in electrical communication with the bus ring, and a distal end portion comprising a plurality of power take-off interfaces, wherein the distal end portion of the or each power take-off module is located substantially within a corner of the housing.

The distal end portion of the or each power take-off module may be configured so that at least some of the power take-off interfaces are offset from one another in at least two directions selected from a group comprising: an axial direction with respect to the central axis of the generator; a radial direction with respect to the central axis of the generator; and a circumferential direction with respect to the central axis of the generator.

In a preferred example, the or each power take-off module may comprise a plurality of power take-off tabs, each power take-off tab having a proximal end portion in electrical communication with the bus ring, and a distal end portion comprising a power take-off interface. The distal end portions of the power take-off tabs may be arranged in a stepped configuration with respect to one another.

The power take-off tabs may be arranged in a stack, wherein each power take-off tab is separated from at least one other power take-off tab by an electrically insulating material.

Each power take-off tab may comprise a plate of electrically conductive material. A central portion of each tab may preferably be substantially planar, wherein the distal end portion of each tab is located in a plane which is substantially perpendicular to the central portion of the tab.

In a preferred example, the stator may have a plurality of multi-phase windings, where each multi-phase winding is in exclusive electrical communication with a dedicated power take-off module.

The housing preferably comprises a power out opening in the proximity of the distal end portion of the or each power take-off module such that each power take-off module has an associated power out opening.

Preferably the housing comprises an access hatch in the proximity of the distal end portion of the or each power take-off module, wherein the access hatch is positioned and sized to provide installation and maintenance access to the power take-off interfaces.

The or each power out opening may be located in a non-drive end face of the housing, wherein the or each access hatch is located in an axially extending face of the housing with respect to the central generator axis.

At least some of the power take-off interfaces of one or more power take-off module may be electrically connected to power take-off cables, wherein the power take-off cables extend from the power take-off interfaces through an associated power out opening to an exterior of the housing.

The power take-off cables preferably extend directly away from the power take-off interfaces such that the power take-off cables are substantially straight at least along a portion extending from the power take-off interfaces to the power out opening.

In an optional example, part of the distal end portion of the or each power take-off module protrudes from the housing through an associated power out opening such that the power out interfaces are located outside the housing.

In another aspect, the present invention provides a method of installing a generator for a wind turbine, the method comprising providing a generator according to the first aspect described above; securing the generator in or on a mounting structure of a wind turbine; and connecting power take-off cables to the power take-off interfaces of the one or more power take-off modules, wherein at least some of the power take-off cables are connected to the power take-off interfaces after the generator has been secured in or on the mounting structure. The mounting structure preferably comprises a nacelle of a wind turbine.

In a further aspect, the present invention provides a method of maintaining a generator for a wind turbine, the method comprising accessing the power take-off cables via an access hatch; disconnecting failed or worn power take-off cables; and connecting replacement power take-off cables, wherein the disconnection and reconnection is effected via one or more access hatch.

In a still further aspect, the present invention provides a power take-off module for a generator for a wind turbine, the module comprising a plurality of power take-off tabs arranged in an array, wherein each tab is separated from at least one other tab by a layer of insulating material, and wherein each tab has a first end portion configured for electrical connection to a bus ring of the generator, and a second end portion comprising a power take-off interface, wherein the second end portions of the power take-off tabs are arranged in a stepped configuration with respect to one another.

Each power take-off tab preferably comprises a plate of electrically conductive material.

A central portion of each tab may be substantially planar, wherein the distal end portion of each tab is located in a plane which is substantially perpendicular to the central portion of the tab.

The bus ring being rigidly attached to the stator windings and the power take-off module(s) being rigidly connected to the generator housing, it is a natural consequence that there may be some differential axial displacement between these two sub-assemblies due to differences in temperature and thermal expansion effects. According to an embodiment of the invention, this issue can be solved by the use of flexible strap or bus connections between the two assemblies that allow for relative displacements without placing undue stress on the connections.

In yet another aspect, the present invention provides a generator for a wind turbine having a central axis, the generator comprising: a housing of substantially cuboidal form; a stator mounted within the housing, the stator comprising one or more multi-phase windings; and a bus ring for conveying electrical power from the one or more multi-phase windings to one or more power take-off modules; wherein the or each power take-off module comprises a proximal end portion in electrical communication with the bus ring, and a distal end portion comprising a plurality of power take-off interfaces, wherein the or each power take-off module comprises a plurality of power take-off tabs, each power take-off tab having a proximal end portion in electrical communication with the bus ring, and a distal end portion comprising a power take-off interface.

In yet a further aspect, the present invention provides a wind turbine comprising a wind turbine tower, a nacelle rotatably coupled to the tower, a rotating hub mounted to the nacelle, and a plurality of wind turbine blades coupled to the hub, wherein the nacelle comprises a generator as described above.

BRIEF DESCRIPTION OF THE DRAWINGS

Non-limiting examples of the present invention will now be described with reference to the accompanying drawings, in which.

DETAILED DESCRIPTION

A specific embodiment of the present invention will now be described in which numerous features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily.

Figure 1:
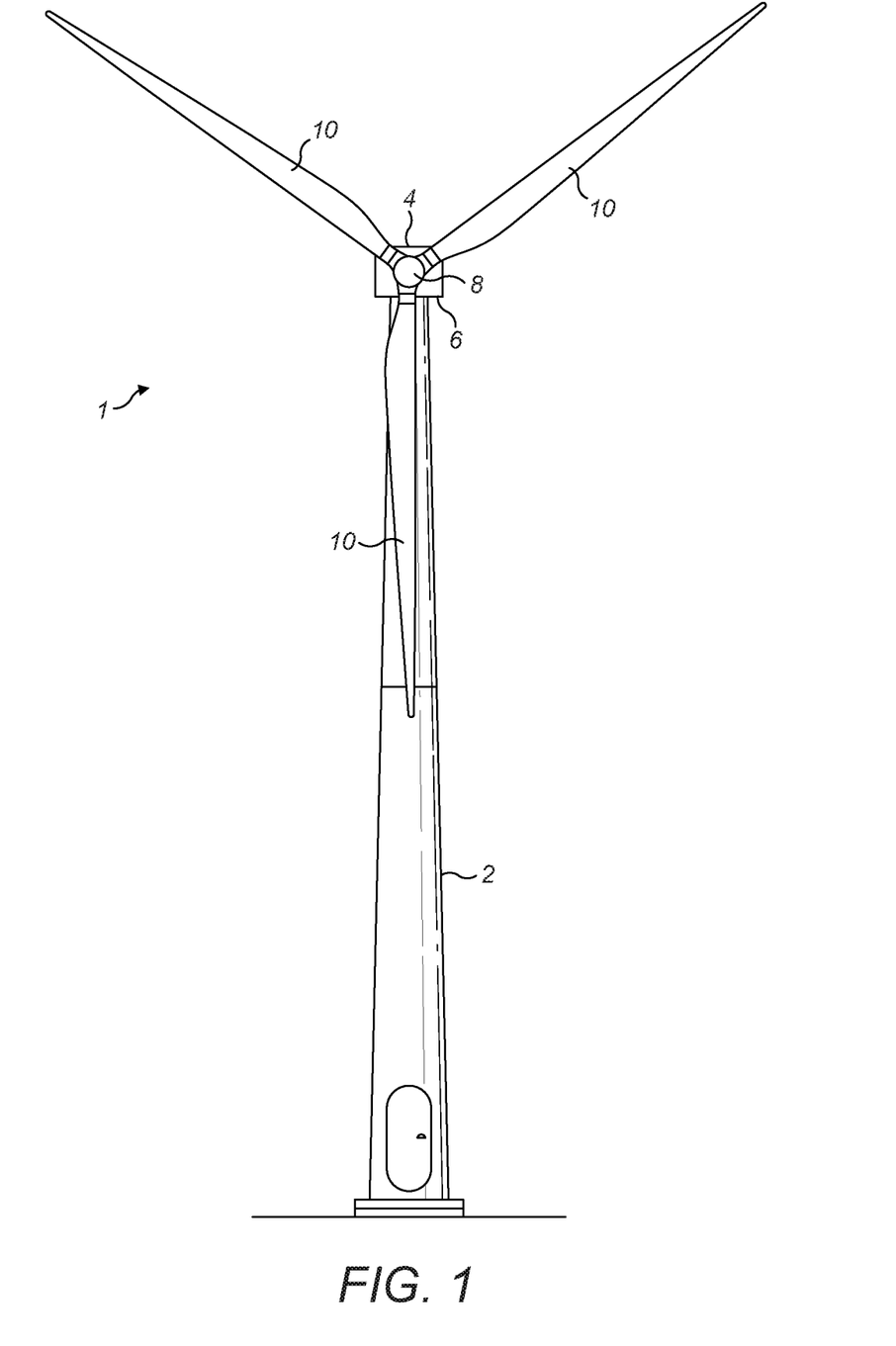
FIG. 1 is a schematic perspective view of a horizontal axis wind turbine.

In order to place the embodiments of the invention in a suitable context, reference will firstly be made to FIG. 1, which illustrates a typical Horizontal Axis Wind Turbine (HAWT) 1 in which a generator for a wind turbine according to an embodiment of the invention may be implemented. Although this particular image depicts an on-shore wind turbine, it will be understood that equivalent features will also be found on off-shore wind turbines. In addition, although the wind turbines are referred to as 'horizontal axis', it will be appreciated by the skilled person that for practical purposes, the axis is usually slightly inclined to prevent contact between the rotor blades and the wind turbine tower in the event of strong winds.

The wind turbine 1 comprises a tower 2, a nacelle 4 rotatably coupled to the top of the tower 2 by a yaw system 6, a rotating hub 8 mounted to the nacelle 4 and a plurality of wind turbine rotor blades 10 coupled to the hub 8. The nacelle 4 and rotor blades 10 are turned and directed into the wind direction by the yaw system 6.

Figure 2:
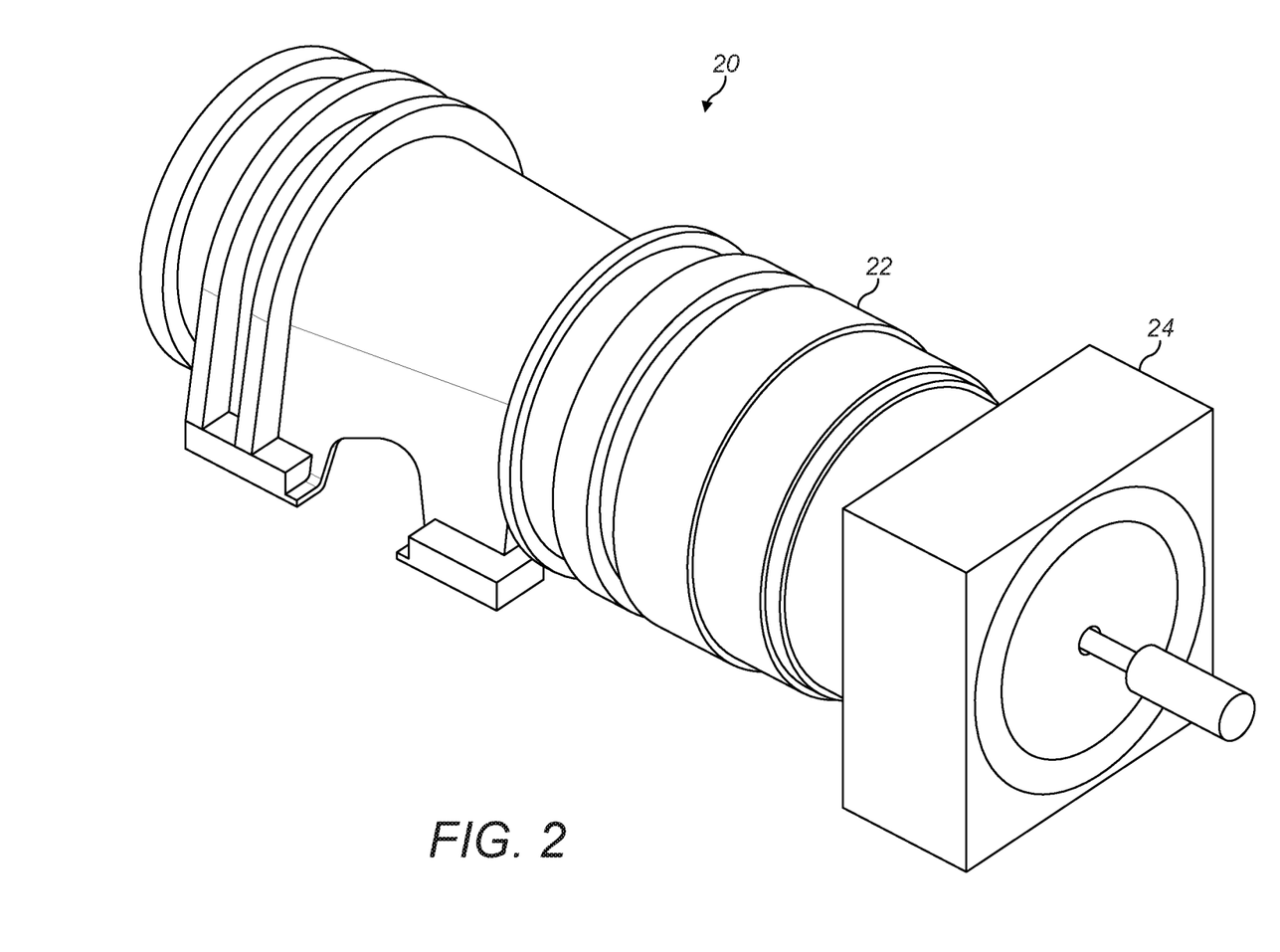
FIG. 2 is a schematic perspective view of functional components a nacelle of the wind turbine.

The nacelle 4 houses many functional components of the wind turbine, including the generator, gearbox, drive train and rotor brake assembly, as well as convertor equipment for converting the mechanical energy of the wind into electrical energy for provision to the grid. With reference to FIG. 2, the nacelle 4 may include a shaft housing 20, a gearbox 22 and a generator 24. A main shaft extends through the shaft housing 20, and is supported on bearings (not shown). The main shaft is connected to, and driven by, the hub 8 and provides input drive to the gearbox 22. The gearbox 22 steps up the rotational speed of the low speed main shaft via internal gears (not shown) and drives a gearbox output shaft. The gearbox output shaft in turn drives the generator 24, which converts the rotation of the gearbox output shaft into electricity. The electricity generated by the generator 24 may then be converted by other components (not shown) as required before being supplied to an appropriate consumer, for example an electrical grid distribution system. As mentioned above, so-called "direct drive" wind turbines that do not use gearboxes are also known. The gearbox may therefore be considered optional.

Figure 3:
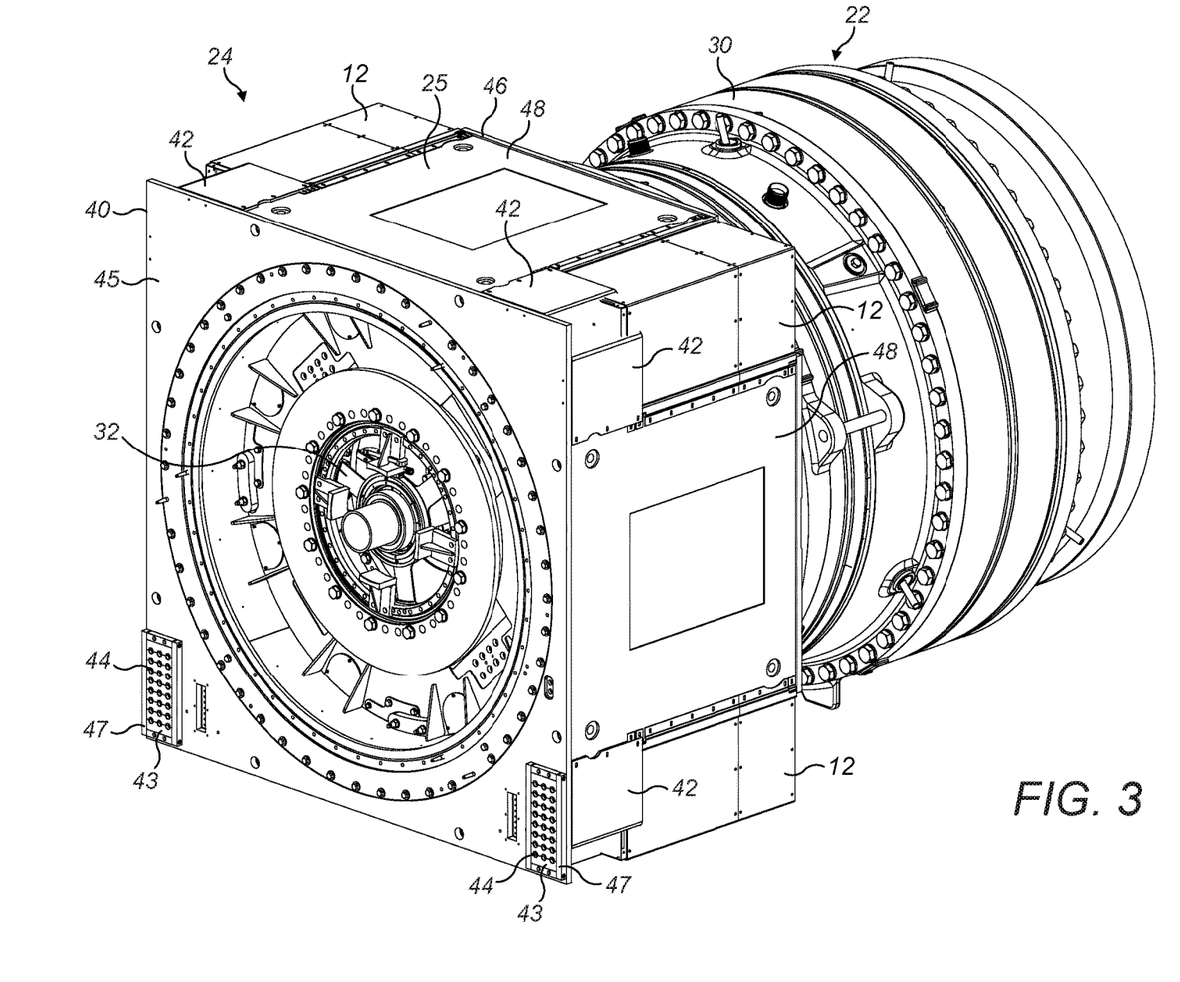
FIG. 3 is a schematic perspective view of a generator for a wind turbine according to the present invention and part of a gearbox.

The gearbox 22 and generator 24 may be coupled together in an integrated unit. Such an integrated unit is shown in FIG. 3 as a specific example. In this Figure, the generator 24 and the gearbox 22 are separate sub-assemblies that themselves have been coupled together to create a single assembly that is comparatively compact. The gearbox 22 is illustrated on the right hand side of the Figure, and the generator 24 is illustrated on the left hand side of the Figure.

With reference firstly to the gearbox 22, a gearbox housing 30 is generally cylindrical in form and is oriented such that its major rotational axis is horizontal, in the orientation of the drawings. The cylindrical configuration of the gearbox housing 30 is due to the specific type of gearbox that is used in the illustrated embodiment, which is an epicyclic gearbox. As the skilled person would know, an epicyclic gearbox comprises a series of planet gears that are arranged about a central sun gear, and which collectively are arranged within an encircling ring gear. The ratio of the number of teeth between the ring gear, the planet gear and the sun gears determines the gear ratio of the gearbox. For clarity, fine detail of the gearbox will not be described in further detail here as the gearbox is not the principal subject of the invention. Suffice to say that other gearbox configurations could also be used, although it is currently envisaged that an epicyclic gearbox provides an elegant solution fit for the confines of a wind turbine nacelle.

Referring to FIG. 3, the output shaft of the gearbox 22 interfaces with a rotor 32 of the generator 24. As such, the major axis of the gearbox output shaft defines the rotational axis of the generator 24.

The generator 24 in the illustrated embodiment is an IPM (interior permanent magnet) electric machine having an external stator 36 (FIG. 5) which surrounds the rotor 32. The stator 36 includes a stator core and a stator frame which surrounds and supports the stator core. The stator core comprises a plurality of lamina stacked in an axial direction of the generator. Field windings of a conductive material such as copper are wound around the lamina of the stator core. An electrical current is induced in the field windings by a fluctuating magnetic field caused by the magnets attached to the rotor 32 which is rotated in use by the hub 8 of the wind turbine 1. Although the example described herein refers to an interior permanent magnet machine, it will be appreciated that in other examples the generator may comprise a rotor having an electro-magnet instead of permanent magnets.

Referring again to FIG. 3, the generator 24 comprises a housing 25 within which the stator 36 is mounted. The housing 25 comprises a stator support frame 40 and a number of panels which extend between a non-drive end face 45 and a drive end face 46 of the stator support frame. As shown, the drive end face 46 is located adjacent to the gearbox 22, and the non-drive end face 45 is located at the opposite end of the generator 24.

The stator support frame 40 has a number of support members (not shown) which extend between the non-drive end face 45 and the drive end face 46. The support members provide structural rigidity to the frame and provide mounting points onto which the stator and housing panels are mounted.

The outer surface of the housing 25 comprises the drive and non-drive end faces 46, 45 of the stator support frame 40, and panels 48, 42 which are removably attached to the stator support frame 40. Environmental conditioning modules 12 are removably attached at each corner of the stator support frame 40, the outer surfaces of which also form part of the generator housing 25.

The non-drive end face 45 comprises two power outlet openings 41 (FIG. 4) located in the vicinity of the lowermost corners 47 of the stator support frame 40 with respect to the orientation of the generator 24 in use. The power outlet openings 41 are covered by cable support glands 43 which are removably attached to the non-drive end face 45 by mechanical fasteners. The cable support gland 43 comprises a plurality of holes 44 through which power take-off cables 72 (FIG. 6) pass.

The removable panels 42 located in the vicinity of the lowermost corners 47 of the non-drive end face 45 cover access hatches 49 (FIG. 4) which provide access to electrical take-off connections within the generator 24 as will be described in greater detail below.

Figure 4:
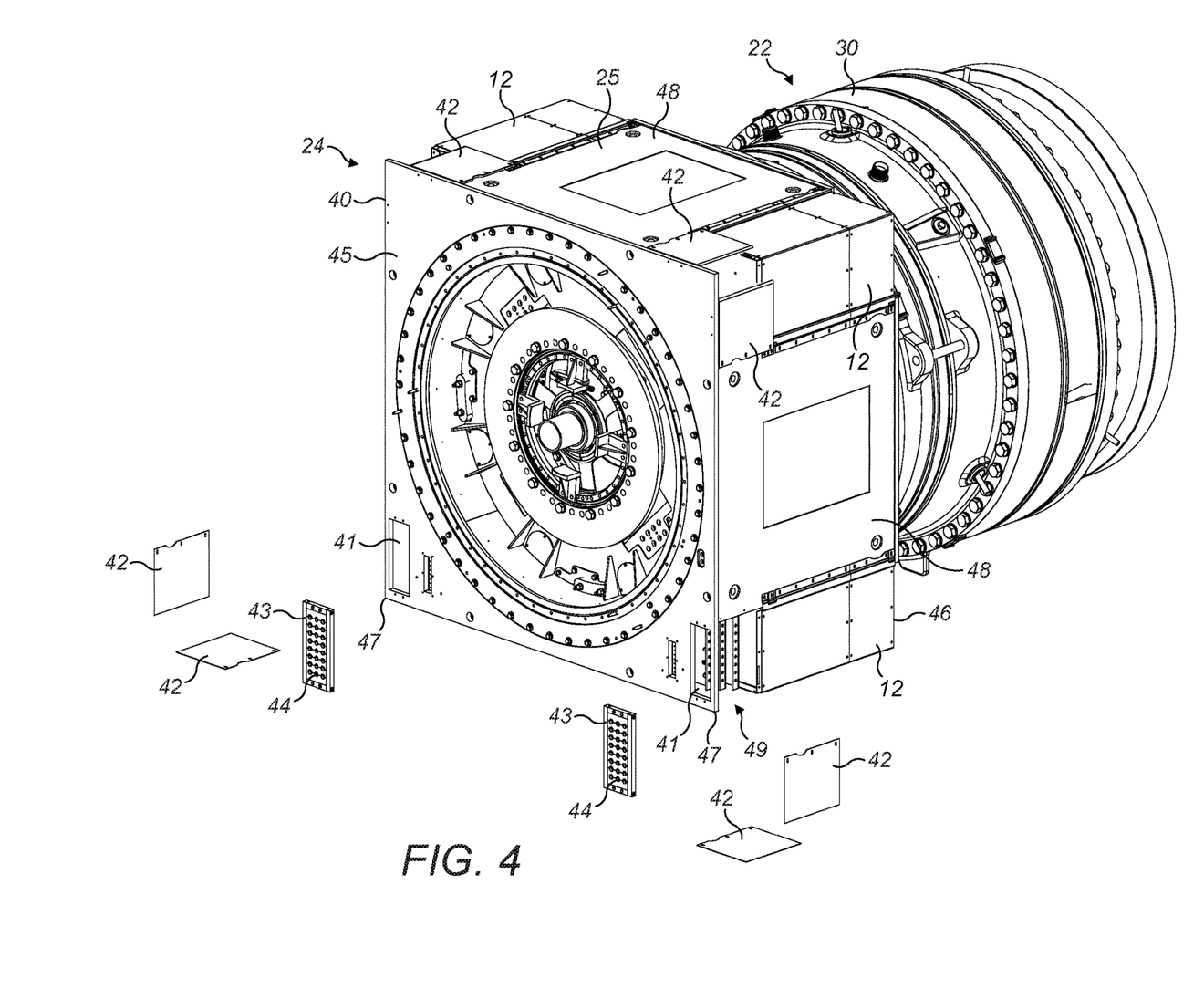
FIG. 4 is a schematic perspective partially exploded view of the generator of FIG. 3.

FIG. 4 shows a partially exploded view of the generator 24 with the cable support glands 43 and panels 42 detached from the stator support frame 40.

Figure 5:
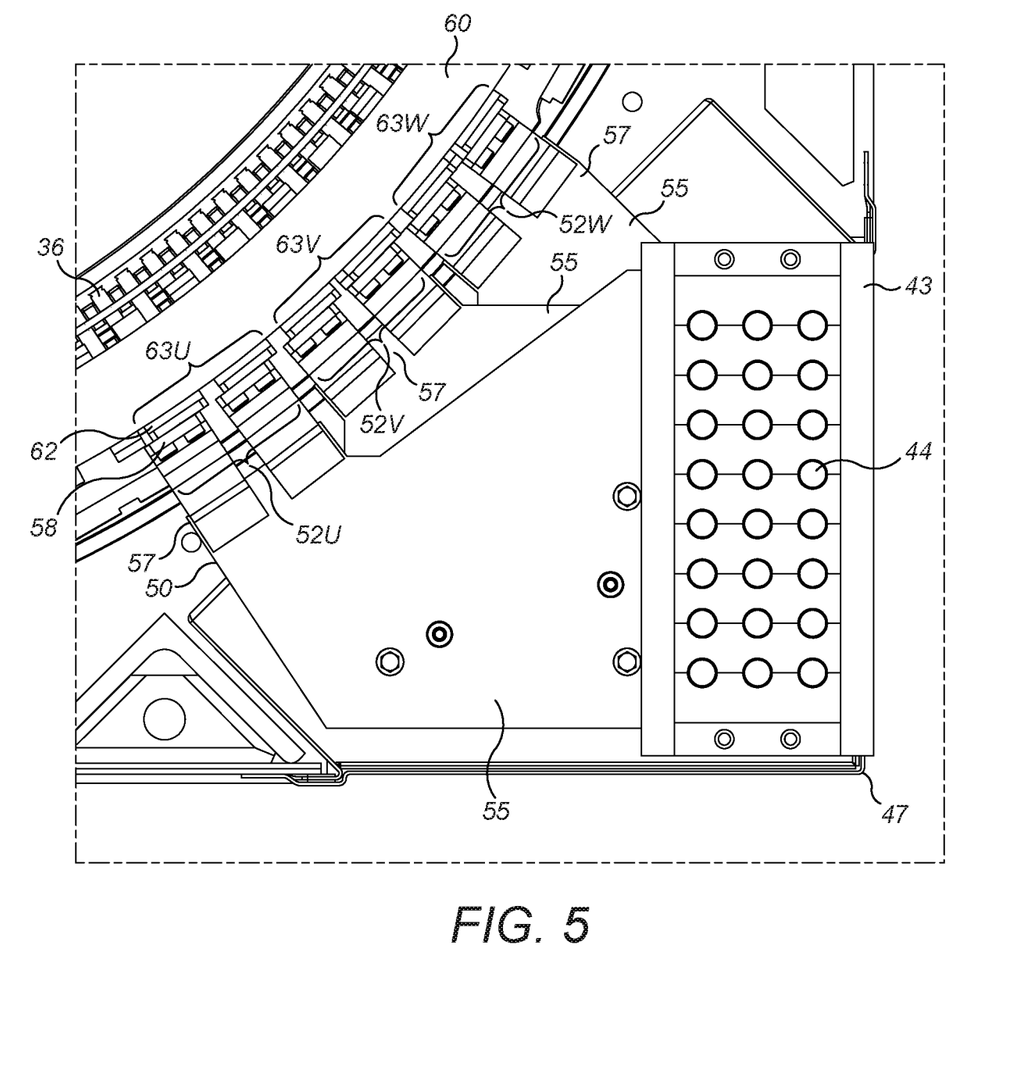
FIG. 5 is a schematic detail view of power a take-off module connected to the bus ring of a generator.

FIG. 5 shows a schematic detail view of a region within the generator 24 in the vicinity of one of the lowermost corners 47 of the stator support frame 40 with the non-drive end face 45 and rotor 32 removed for clarity. The stator 36 is shown connected to bus ring 60 which is connected in turn to a power take-off module 50. The power take-off module 50 is supported within the housing 25 by brackets.

The bus ring 60 comprises a plurality of discrete ring members which are electrically insulated from one another. Each ring member carries current from one of the stator windings to ring power take-off connections 62. In this specific example the generator 24 comprises two three-phase windings. Electrical current generated by a first one of the three-phase windings is routed to a first power take-off module 50 located substantially at a first one of the lowermost corners 47 of the stator support frame 40 as shown in FIG. 5, and electrical current generated by a second one of the three-phase windings is routed to a second power take-off module 50 located substantially at a second one of the lowermost corners 47 of the stator support frame 40.

Each phase of each three-phase winding is connected to a separate one of the discrete ring members of the bus ring 60 so that the electric current generated by each phase remains independent of the electric current generated by each of the other phases.

As shown in FIG. 5, the bus ring 60 has six ring power take-off connections 62 located on a section of the bus ring 60 in the vicinity of the lowermost corner 47 of the stator support frame 40. The six ring power take-off connections 62 comprise three separate groups 63u, 63v, 63w of two ring power take-off connections 62. The first group 63u of ring power take-off connections 62 are attached to a first discrete ring member of the bus ring 60 to carry current generated by the U phase of the first three-phase winding, the second group 63v of ring power take-off connections 62 are attached to a second discrete ring member of the bus ring 60 to carry current generated by the V phase of the first three-phase winding, and the third group 63w of ring power take-off connections 62 are attached to a third discrete ring member of the bus ring 60 to carry current generated by the W phase of the first three-phase winding.

The power take-off module 50 has a proximal end portion 54 connected to the power take-off connections 62 of the bus ring 60, and a distal end portion 53 comprising power take off interfaces 59. The power take-off module 50 comprises three power take-off tabs 51u, 51v, 51w each comprising a copper plate having a substantially planar central portion 55 located between a proximal end portion 57 and a distal end portion 56 of the power take-off tabs. Each distal end portion 56 of each power take-off tab 51u, 51v, 51w comprises a plurality of power take-off interfaces 59. In this example the power take-off interface 59 comprise holes formed in the distal end portions 56 of the power take-off tabs 51u, 51v, 51w. The three power take-off tabs 51u, 51v, 51w are electrically insulated from one another by insulating material 78, such as a layer of insulating material, and arranged together in a stack secured by fasteners 80 (FIG. 8).

Each proximal end portion 57 of each power take-off tab 51u, 51v, 51w comprises a group 52u, 52v, 52w of two module power take-off connections 58. The group 52u of module power take-off connections 58 of power take-off tab 51u are connected to the group 63u of ring power take-off connections 62 of the bus ring 60. Similarly, the group 52v of module power take-off connections 58 of power take-off tab 51v are connected to the group 63v of ring power take-off connections 62 of the bus ring 60, and the group 52w of module power take-off connections 58 of power take-off tab 51w are connected to the group 63w of ring power take-off connections 62 of the bus ring 60.

Figure 6:
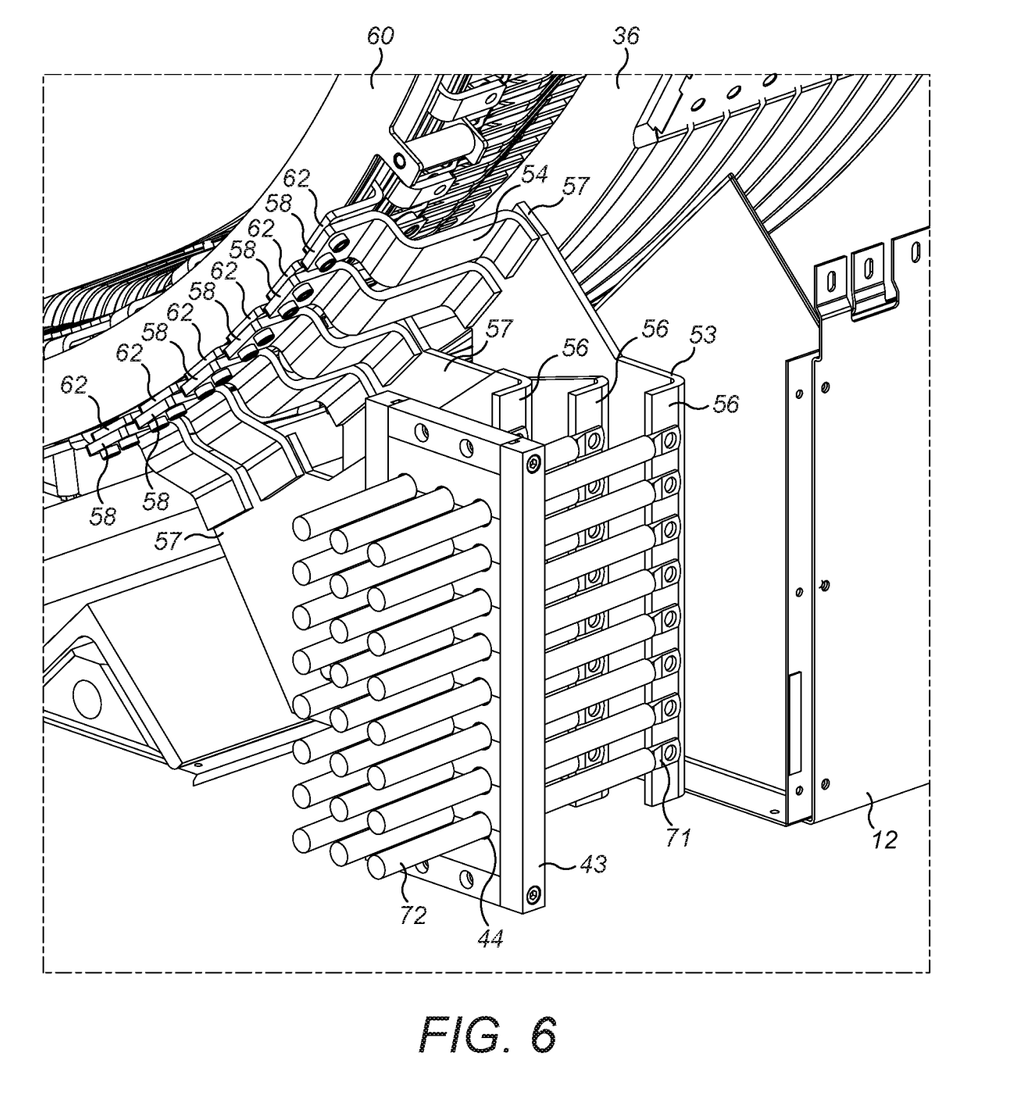
FIG. 6 is a schematic detail view of power take-off cables connected to power take-off interfaces of the power take-off module of FIG. 5.
Figure 7:
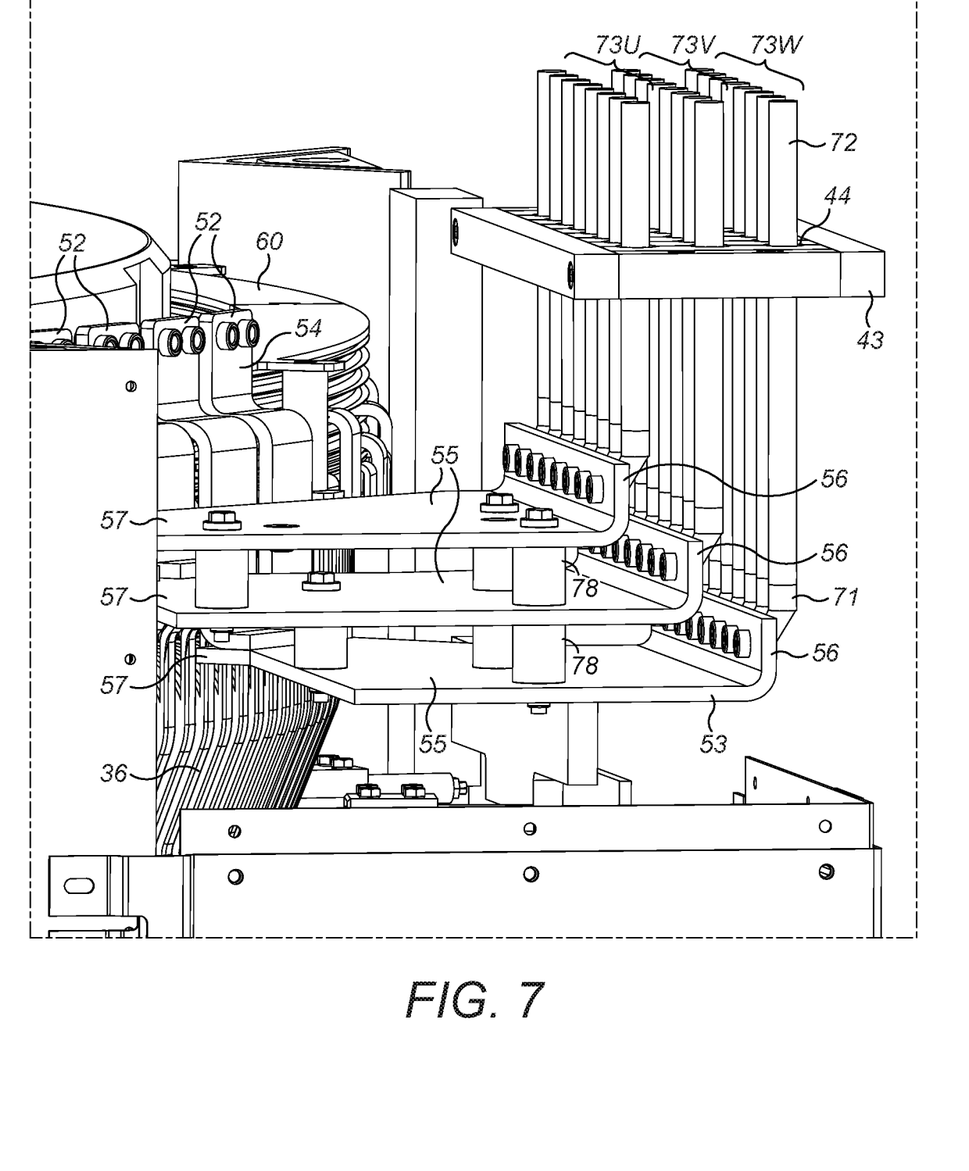
FIG. 7 is an alternative schematic detail view of the power take-off cables connected to the power take-off interfaces.

Referring now to FIGS. 6 and 7, the distal end portion 53 of the power take of module 50 is shown. A plurality of power take-off cables 72 are attached to the distal end portion 53 via cable connectors 71 which are connected to the power take-off interfaces 59. The power take-off cables 72 pass through and are supported by the holes 44 in the cable support gland 43 which is positioned over the power out opening 41 in the non-drive end face 45 of the stator support frame 40. The power take-off cables 72 extend along a substantially straight path from the power take-off interfaces 59 to the power out opening 41 providing the advantage that the power take-off cables need not be bent in order to reach the power out opening 41.

Figure 8:
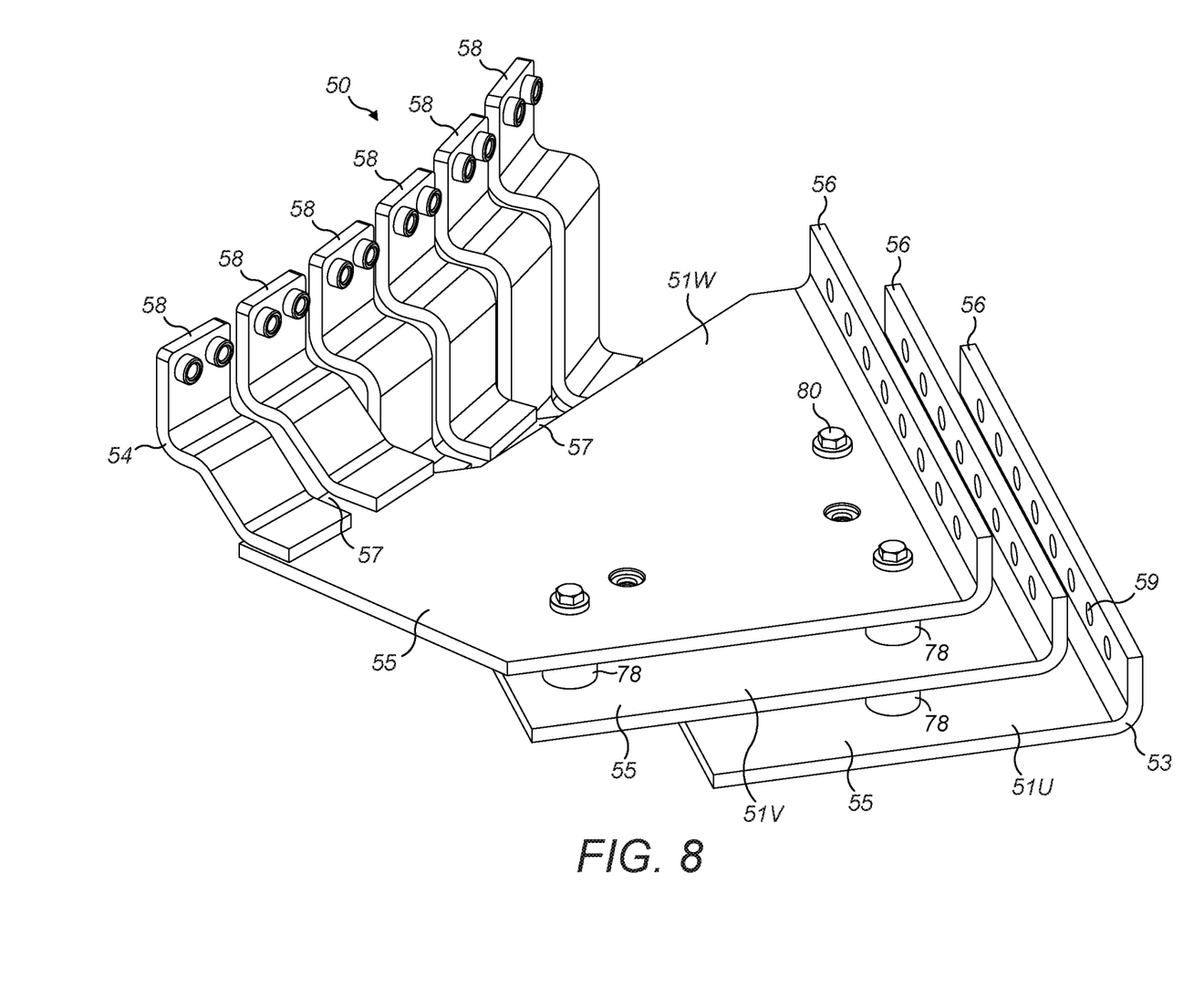
FIG. 8 is a schematic view of a power take-off module according to the present invention.

As best shown in FIGS. 7 and 8, the distal end portions 56 of each power take-off tab 51u, 51v, 51w are bent at an approximate 90° angle to the central planar portions 55 such that the distal end portions 56 are substantially perpendicular to the central planar portions 55. As can be seen most clearly in FIG. 7, each power take-off tab 51u, 51v, 51w is shaped so that the distal end portions 56 are staggered with respect to one another in two planes such that the distal end portions 56 form a staircase or stepped arrangement. The power take-off interfaces 59 are substantially equally spaced along the distal end portion 56 of each power take-off tab 51u, 51v, 51w.

The combination of the stepped arrangement of the distal ends 56 of the power take-off tabs 51u, 51v, 51w, and the spacing of the power take-off interfaces 59, allows each power take off cable 72 to be attached to a power take-off interface 59 without interference or clashes with any other power take-off cable 72.

Although not shown, it is to be understood that an equivalent arrangement of bus ring 60 and power take-off module 50 is also present on the other side of the generator 24 in the vicinity of the second lowermost corner 47 of the stator support frame 40.

The provision of the power take-off modules 50 in place of the complex "flying leads" of the prior art mean that the generator 24 can be manufactured more efficiently with less likelihood of errors being made during assembly. In addition, as a result of the configuration of the distal end portion 53 of the power take-off modules 50, together with the removable panels 42, the power take-off cables 72 can be fitted to the generator after the generator has been delivered from the manufacturer, either before or after its installation in the nacelle 4. This reduces the bill of materials of the generator thereby reducing cost. Furthermore, the transportation of the generator 24 is made easier as there are no delicate "flying leads" to protect.

As best shown in FIGS. 6 and 7, when the removable panels 42 are removed, a fitter has access to the connections between the cable connectors 71 and the power take-off interfaces 59 via the access hatch 49. During installation and commissioning of the generator 24, a first group 73u of power take of cables 72 are connected to the power take-off interfaces 59 of a first power take-off tab 51u to carry power generated by the U phase of the first three-phase winding to the power conversion equipment. Similarly, a second group 73v of power take of cables 72 are connected to the power take-off interfaces 59 of a second power take-off tab 51v to carry power generated by the V phase of the first three-phase winding to the power conversion equipment, and a third group 73w of power take of cables 72 are connected to the power take-off interfaces 59 of a third power take-off tab 51w to carry power generated by the W phase of the first three-phase winding to the power conversion equipment. This procedure is repeated for the second power take-off module 50 located at the second lowermost corner 47 of the stator support frame 40 for the second three-phase winding.

For ease of fitting, the first group 73u of power take-off cables 72 are connected first since they underlie the second 73v and third 73w groups of power take-off cables 72. Subsequently, the second group 73v of power take-off cables 72 are connected before finally the third group 73w of power take-off cables 72 are connected.

Should any connection or power take-off cable fail during use of the generator 24, the cables 72 and connectors 71 can be readily accessed for maintenance by removing the panels 42. Since all of the connections are substantially located in one of two areas of the generator 24, it is significantly less complex to locate and repair a failed connector 71 or cable 72 than in a prior art generator.

It will be appreciated that modifications may be made to the example generator 24 described without departing from the scope of the claims that follow. In particular, in one alternative example, the distal end portions 56 of the power take-off tabs 51u, 51v, 51w may protrude through the cable support gland 43 so that the power take-off interfaces 59 are located outside of the generator housing 25 for connection to the power take-off cables 72.

It is not essential that the power take-off modules 50 be located in the lowermost corners 47 of the stator support frame 40. For example, the power take-off modules may be located in the uppermost corners or at any other suitable location within the generator housing 25. The particular arrangement of providing non-permanent cable connections in the corners of the generator housing 25 reduces the overall volume of the generator housing 25 and permits a more compact integration of the generator 24 within the nacelle 24.

It is also not essential that more than one power take-off module 50 be provided and it is expressly contemplated that a generator 24 may comprise only one power take-off module 50 which serves to convey the power generated by all of the phase windings to power take-off cables 72.

Although the above example has been described with three groups 63u, 63v, 63w of two ring power take-off connections 62 connected to three groups 52u, 52v, 52w of two module power take-off connections 58, it will be understood that any number of ring power take-off connections 62 may be connected to any number of module power take-off connections 58. Similarly, any number of power take-off cables 72 may be connected to any number of power take-off interfaces 59 located at the distal end portion 53 of the power take-off modules 50. It is not essential that the power take-off interfaces 59 be arranged in a substantially stepped arrangement as shown in the Figures. However, the power take-off interfaces 59 are preferably offset from one another in at least two directions including an axial direction, a radial direction, or a circumferential direction, each with respect to the central axis of the generator (24).

The power take-off tabs 51u 51v, 51w of the power take-off modules 50 may comprise conductive materials other than copper, and may have a configuration other than plate like. Similarly, the power take-off tabs 51u 51v, 51w may comprise a single piece of conductive material, or may be made up of a plurality of pieces connected together by fastenings, welds, solders or the like.

The invention claimed is:

1. A generator for a wind turbine having a central axis, the generator comprising:
    a housing of substantially cuboidal form;
    a stator mounted within the housing, the stator comprising one or more multi-phase windings; and
    a bus ring for conveying electrical power from the one or more multi-phase windings to one or more power take-off modules;
    wherein the or each power take-off module comprises a proximal end portion in electrical communication with the bus ring, and a distal end portion comprising a plurality of power take-off interfaces, each of the plurality of power take-off interfaces configured to be selectively connectable to respective power cables, and
    wherein the distal end portion of the or each power take-off module is located substantially within a corner of the housing.

2. The generator for a wind turbine according to claim 1, wherein the distal end portion of the or each power take-off module is configured so that at least some of the power take-off interfaces are offset from one another in at least two directions selected from a group comprising:
    an axial direction with respect to the central axis of the generator;
    a radial direction with respect to the central axis of the generator; or
    a circumferential direction with respect to the central axis of the generator.

3. The generator for a wind turbine according to claim 1, wherein the or each power take-off module comprises a plurality of power take-off tabs, each power take-off tab having a proximal end portion in electrical communication with the bus ring, and a distal end portion comprising a power take-off interface.

4. The generator for a wind turbine according to claim 3, wherein the distal end portions of the power take-off tabs are arranged in a stepped configuration with respect to one another.

5. The generator for a wind turbine according to claim 1, wherein the stator has a plurality of multi-phase windings, and wherein each multi-phase winding is in exclusive electrical communication with a dedicated power take-off module.

6. The generator for a wind turbine according to claim 1, wherein the housing comprises a power out opening in the proximity of the distal end portion of the or each power take-off module such that each power take-off module has an associated power out opening.

7. The generator for a wind turbine according to claim 6, wherein the housing comprises an access hatch in the proximity of the distal end portion of the or each power take-off module, wherein the access hatch is positioned and sized to provide installation and maintenance access to the power take-off interfaces.

8. The generator for a wind turbine according to claim 7, wherein the or each power out opening is located in a non-drive end face of the housing, and wherein the or each access hatch is located in an axially extending face of the housing with respect to the central generator axis.

9. The generator for a wind turbine according to claim 6, wherein at least some of the power take-off interfaces of the one or more power take-off module are electrically connected to power take-off cables, and wherein the power take-off cables extend from the power take-off interfaces through an associated power out opening to an exterior of the housing.

10. The generator for a wind turbine according to claim 9, wherein the power take-off cables extend directly away from the power take-off interfaces such that the power take-off cables are substantially straight at least along a portion extending from the power take-off interfaces to the power out opening.

11. A method of maintaining a generator for a wind turbine according to claim 9, the method comprising:
    accessing the power take-off cables via an access hatch;
    disconnecting failed or worn power take-off cables; and
    connecting replacement power take-off cables, wherein the disconnection and reconnection is affected via one or more access hatch.

12. The generator for a wind turbine according to claim 6, wherein part of the distal end portion of the or each power take-off module protrudes from the housing through the associated power out opening such that the power take-off interfaces are located outside the housing.

13. A method of installing a generator for a wind turbine, the method comprising:
    providing a generator according to claim 1;
    securing the generator in or on a mounting structure of a wind turbine; and
    connecting power take-off cables to the power take-off interfaces of the one or more power take-off modules, wherein at least some of the power take-off cables are connected to the power take-off interfaces after the generator has been secured in or on the mounting structure.

14. The method according to claim 13, where the mounting structure comprises a nacelle of a wind turbine.

15. A wind turbine comprising a wind turbine tower, a nacelle rotatably coupled to the tower, a rotating hub mounted to the nacelle, and a plurality of wind turbine blades coupled to the hub, wherein the nacelle comprises a generator according to claim 1.

16. A generator for a wind turbine having a central axis, the generator comprising:
a housing of substantially cuboidal form;
a stator mounted within the housing, the stator comprising one or more multi-phase windings; and
a bus ring for conveying electrical power from the one or more multi-phase windings to one or more power take-off modules,
wherein the or each power take-off module comprises a proximal end portion in electrical communication with the bus ring, and a distal end portion comprising a plurality of power take-off interfaces,
wherein the distal end portion of the or each power take-off module is located substantially within a corner of the housing,
wherein the or each power take-off module comprises a plurality of power take-off tabs, each power take-off tab having a proximal end portion in electrical communication with the bus ring, and a distal end portion comprising the power take-off interfaces,
wherein the power take-off tabs are arranged in a stack, and wherein each power take-off tab is separated from at least one other power take-off tab by an electrically insulating material.

17. The generator for a wind turbine according to claim 16, wherein each power take-off tab comprises a plate of electrically conductive material.

18. The generator for a wind turbine according to claim 17, wherein a central portion of each power take-off tab is substantially planar, and wherein the distal end portion of each power take-off tab is located in a plane which is substantially perpendicular to the central portion of the power take-off tab.

19. A power take-off module for a generator for a wind turbine, the module comprising a plurality of power take-off tabs arranged in an array, wherein each tab is separated from at least one other tab by an insulating material, and wherein each tab has a first end portion configured for electrical connection to a bus ring of the generator, and a second end portion comprising a power take-off interface, wherein the second end portions of the power take-off tabs are arranged in a stepped configuration with respect to one another.

20. The power take-off module according to claim 19, wherein each power take-off tab comprises a plate of electrically conductive material.

21. The power take-off module according to claim 20, wherein a central portion of each tab is substantially planar, and wherein the second end portion of each tab is located in a plane which is substantially perpendicular to the central portion of the tab.

22. A generator for a wind turbine having a central axis, the generator comprising:
a housing of substantially cuboidal form; and
a bus ring for conveying electrical power from one or more multi-phase windings to one or more power take-off modules;
wherein the or each power take-off module comprises a proximal end portion in electrical communication with the bus ring, and a distal end portion comprising a plurality of power take-off interfaces, each of the plurality of power take-off interfaces configured to be selectively connectable to respective power cables,
wherein the or each power take-off module comprises a plurality of power take-off tabs, each power take-off tab having a proximal end portion in electrical communication with the bus ring, and a distal end portion comprising the power take-off interfaces.

* * * * *